US012028686B2

(12) United States Patent
Troelsen et al.

(10) Patent No.: US 12,028,686 B2
(45) Date of Patent: *Jul. 2, 2024

(54) RF ANTENNA AND HEARING DEVICE WITH RF ANTENNA

(71) Applicant: Oticon A/S, Smørum (DK)

(72) Inventors: Jens Troelsen, Smørum (DK); Oliver Sundberg, Smørum (DK); Kåre Tais Christensen, Smørum (DK); Henning Knak Poulsen, Roskilde (DK)

(73) Assignee: Oticon A/S, Smørum (DK)

( * ) Notice: Subject to any disclaimer, the term of this patent is extended or adjusted under 35 U.S.C. 154(b) by 0 days.

This patent is subject to a terminal disclaimer.

(21) Appl. No.: 18/355,970

(22) Filed: Jul. 20, 2023

(65) Prior Publication Data

US 2024/0022865 A1 Jan. 18, 2024

Related U.S. Application Data

(63) Continuation of application No. 17/994,689, filed on Nov. 28, 2022, now Pat. No. 11,750,986, which is a (Continued)

(30) Foreign Application Priority Data

Aug. 9, 2013 (EP) .................................... 13179815

(51) Int. Cl.

*H04R 25/00* (2006.01)
*H01Q 1/27* (2006.01)

(Continued)

(52) U.S. Cl.

CPC ........... *H04R 25/554* (2013.01); *H01Q 1/273* (2013.01); *H01Q 1/38* (2013.01); *H01Q 1/50* (2013.01);

(Continued)

(58) Field of Classification Search

CPC . H01Q 1/273; H01Q 1/38; H01Q 1/50; H04R 25/305; H04R 25/554; H04R 25/604; H04R 2225/51

(Continued)

(56) References Cited

U.S. PATENT DOCUMENTS

| | | | |
|---|---|---|---|
| 9,680,209 | B2 | 6/2017 | Troelsen et al. |
| 9,961,457 | B2 | 5/2018 | Troelsen et al. |

(Continued)

FOREIGN PATENT DOCUMENTS

| | | | |
|---|---|---|---|
| EP | 1 326 302 | A2 | 7/2003 |
| EP | 1 587 343 | A2 | 10/2005 |

(Continued)

*Primary Examiner* — Harry S Hong

(74) *Attorney, Agent, or Firm* — Birch, Stewart, Kolasch & Birch, LLP

(57) ABSTRACT

The present disclosure relates to a hearing aid with an RF antenna arranged within the hearing aid's housing, and a loudspeaker positioned in the ear canal of the user. The RF antenna is configured to receive and/or transmit electromagnetic RF signals within a first frequency range enclosing a first frequency of resonance of the RF antenna corresponding to a first wavelength. The hearing aid further comprises one or more electric leads electrically connected to lead one or more electric signals within a second frequency range not overlapping the first frequency range between the loudspeaker in the ear canal of the user and an electronic circuit in the housing, with the one or more electrical leads being decoupled, at a connector end of the one or more electrical leads, by means of one or more decoupling components.

14 Claims, 3 Drawing Sheets

Related U.S. Application Data continuation of application No. 17/549,333, filed on Dec. 13, 2021, now Pat. No. 11,546,706, which is a continuation of application No. 17/187,102, filed on Feb. 26, 2021, now Pat. No. 11,228,850, which is a continuation of application No. 16/991,862, filed on Aug. 12, 2020, now Pat. No. 10,966,037, which is a continuation of application No. 16/723,489, filed on Dec. 20, 2019, now Pat. No. 10,779,095, which is a continuation of application No. 16/380,570, filed on Apr. 10, 2019, now Pat. No. 10,555,097, which is a continuation of application No. 16/164,051, filed on Oct. 18, 2018, now Pat. No. 10,306,382, which is a continuation of application No. 15/937,074, filed on Mar. 27, 2018, now Pat. No. 10,136,230, which is a continuation of application No. 15/589,592, filed on May 8, 2017, now Pat. No. 9,961,457, which is a continuation of application No. 14/455,558, filed on Aug. 8, 2014, now Pat. No. 9,680,209.

(51) Int. Cl.
*H01Q 1/38* (2006.01)
*H01Q 1/50* (2006.01)

(52) U.S. Cl.
CPC ......... *H04R 25/305* (2013.01); *H04R 25/604* (2013.01); *H04R 2225/51* (2013.01)

(58) Field of Classification Search
USPC ........................................... 343/718; 381/315
See application file for complete search history.

(56) References Cited

U.S. PATENT DOCUMENTS

| | | | | |
|---|---|---|---|---|
| 10,136,230 | B2 | 11/2018 | Troelsen et al. | |
| 10,306,382 | B2 | 5/2019 | Troelsen | |
| 10,555,097 | B2 | 2/2020 | Troelsen et al. | |
| 10,779,095 | B2 | 9/2020 | Troelsen et al. | |
| 10,966,037 | B2 | 3/2021 | Troelsen et al. | |
| 11,228,850 | B2 | 1/2022 | Troelsen et al. | |
| 11,546,706 | B2 | 1/2023 | Troelsen et al. | |
| 11,750,986 | B2 * | 9/2023 | Troelsen .............. | H04R 25/604 381/315 |
| 2003/0122713 | A1 | 7/2003 | Morris et al. | |
| 2005/0111681 | A1 | 5/2005 | Essabar | |
| 2008/0056520 | A1 | 3/2008 | Christensen et al. | |
| 2009/0033574 | A1 | 2/2009 | Hung | |
| 2009/0046879 | A1 | 2/2009 | Knudsen | |
| 2009/0196444 | A1 | 8/2009 | Solum | |
| 2009/0262970 | A1 | 10/2009 | Shin et al. | |
| 2010/0239029 | A1 | 9/2010 | Komori et al. | |
| 2015/0043763 | A1 | 2/2015 | Troelsen et al. | |
| 2017/0245068 | A1 | 8/2017 | Troelsen et al. | |
| 2018/0213338 | A1 | 7/2018 | Troelsen et al. | |
| 2019/0052980 | A1 | 2/2019 | Troelsen et al. | |
| 2019/0239003 | A1 | 8/2019 | Troelsen et al. | |
| 2020/0128336 | A1 | 4/2020 | Troelsen et al. | |
| 2020/0374640 | A1 | 11/2020 | Troelsen et al. | |
| 2021/0185457 | A1 | 6/2021 | Troelsen et al. | |
| 2022/0103953 | A1 | 3/2022 | Troelsen et al. | |
| 2023/0092761 | A1 * | 3/2023 | Troelsen .............. | H04R 25/604 381/315 |

FOREIGN PATENT DOCUMENTS

| | | | |
|---|---|---|---|
| EP | 1 624 586 | A1 | 2/2006 |
| EP | 2 088 804 | A1 | 8/2009 |
| EP | 2 230 718 | A1 | 9/2010 |
| WO | WO 2005/055655 | A1 | 6/2005 |
| WO | WO 2005/081583 | A1 | 9/2005 |

* cited by examiner

RF ANTENNA AND HEARING DEVICE WITH RF ANTENNA

CROSS-REFERENCE TO RELATED APPLICATIONS

This application is a Continuation of co-pending U.S. patent application Ser. No. 17/994,689 filed Nov. 28, 2022, which is a Continuation of U.S. patent application Ser. No. 17/549,333 filed Dec. 13, 2021 (now U.S. Pat. No. 11,546, 706 issued Jan. 3, 2023), which is a Continuation of U.S. patent application Ser. No. 17/187,102, filed on Feb. 26, 2021 (now U.S. Pat. No. 11,228,850 issued Jan. 18, 2022), which is a Continuation of U.S. patent application Ser. No. 16/991,862, filed on Aug. 12, 2020 (now U.S. Pat. No. 10,966,037 issued on Mar. 30, 2021), which is a Continuation of U.S. application Ser. No. 16/723,489, filed on Dec. 20, 2019 (now U.S. Pat. No. 10,779,095 issued on Sep. 15, 2020), which is a Continuation of U.S. patent application Ser. No. 16/380,570, filed on Apr. 10, 2019 (now U.S. Pat. No. 10,555,097 issued on Feb. 4, 2020), which is a Continuation of U.S. patent application Ser. No. 16/164,051, filed on Oct. 18, 2018 (now U.S. Pat. No. 10,306,382 issued on May 28, 2019), which is a Continuation of U.S. patent application Ser. No. 15/937,074, filed on Mar. 27, 2018 (now U.S. Pat. No. 10,136,230 issued on Nov. 20, 2018), which is a Continuation of U.S. patent application Ser. No. 15/589, 592, filed on May 8, 2017 (now U.S. Pat. No. 9,961,457 issued on May 1, 2018), which is a Continuation of U.S. patent application Ser. No. 14/455,558, filed on Aug. 8, 2014 (now U.S. Pat. No. 9,680,209 issued on Jun. 13, 2017), which claims the benefit of Patent Application No. EP 13179815.9 filed in Europe, on Aug. 9, 2013. The entire contents of the aforementioned applications are hereby incorporated by reference.

TECHNICAL FIELD

The present disclosure relates to a radio-frequency (RF) antenna for receiving and/or transmitting RF electromagnetic signals and to a hearing device comprising such an RF antenna, e.g. a hearing aid or a listening device, which receives acoustic or electronic audio signals from a person's surroundings, modifies the received signals electronically and transmits the modified audio signals into the person's ear or ear canal. The disclosure may e.g. be useful in applications such as compensating for a hearing-impaired person's loss of hearing capability, augmenting a normal-hearing person's hearing capability and/or conveying electronic audio signals to a person.

BACKGROUND ART

Patent application WO 2005/055655 A1 discloses a hearing aid with a casing intended to be worn behind the ear of a user and a tube leading sound from a receiver, i.e. a loudspeaker, in the casing to the ear canal of the user. The term "Behind-The-Ear" or "BTE" is commonly used to designate this type of hearing aids. A similar type of hearing aids, commonly designated as "Receiver-In-The-Ear" or "RITE", has the receiver or loudspeaker arranged in the ear canal, and instead of a tube, an electric connection leads an audio signal from an amplifier in the casing to the loudspeaker. For both of these hearing-aid types, it is commonly known to arrange a portion of the casing on the top of the ridge between the pinna and the head, i.e. where the temple bar of spectacles normally rests. One or more microphones are preferably arranged in this portion of the casing such that sounds from the users environment may be picked up relatively undisturbed by the pinna. In the hearing aid disclosed in WO 2005/055655 A1, two such microphones are arranged in said portion of the casing, which allows for providing various forwards- and/or backwards-oriented directional microphone signals by combining the outputs of the two microphones.

Patent application EP 1 587 343 A2 discloses a hearing aid with an RF antenna constituted by a metallic layer in the casing material or on the casing surface and which thus does not take up space within the housing. In one embodiment, the antenna is coiled around the same portion of the housing in which microphones are preferably arranged as explained above. Connecting the disclosed antenna to an RF transmitter and/or receiver within the casing may require handling delicate and fragile wires.

Patent application US 2009/0262970 A1 discloses a headset in which a cable connecting a microphone PCB and a connector comprises an antenna wire for receiving FM radio broadcasts as well as a number of audio wires. The audio wires are decoupled at the connector end of the cable by means of ferrite beads. The headset antenna is not suitable for receiving or transmitting RF signals in the GHz range.

Patent application US 2009/0033574 A1 discloses a headset in which a cable connecting a loudspeaker and a connector comprises an antenna wire for receiving FM radio broadcasts as well as a number of audio wires. The audio wires are decoupled at the connector end of the cable by means of inductors. The headset antenna is not suitable for receiving or transmitting RF signals in the GHz range.

Patent application EP 2 230 718 discloses an earphone receiver. The device includes a tuner unit that receives broadcast waves. A multi-core shielded cable is used as an antenna.

In hearing devices and in other kinds of electronic devices, it is often desirable to arrange an RF antenna close to other electronic components, which are not directly involved in the RF reception or RF transmission, such as e.g. a microphone, e.g. in order to save space or provide a smooth outer surface of the device without protruding antennas. Electronic components and other electrically conductive elements arranged close to the RF antenna may, however, disturb the latter, thereby deteriorating the antenna matching and thus decreasing the total radiation efficiency, i.e. the sum of the radiation efficiency and any mismatch losses. The problem more or less scales with the wavelength of the RF signals. For instance, at 2.4 GHz, which is e.g. used for Bluetooth signals, the wavelength is about 12 cm, and a quarter-wavelength antenna has a length of about 3 cm. In this case, a distance of about 3 mm, i.e. about 2.4% of the wavelength, or more to other electrically conductive parts is required to avoid disturbances. Maintaining such a minimum distance in a small apparatus, such as a hearing device intended to be worn at an ear, may significantly increase the size of the apparatus and/or put undesired constraints on the placement of further components within the apparatus.

DISCLOSURE

It is an object of the present disclosure to provide an RF antenna for receiving and/or transmitting RF signals, which allows for arranging the RF antenna and one or more electronic components not directly involved in the RF reception or RF transmission in the same portion of the housing without the disadvantages of the prior art.

It is a further object of the present disclosure to provide a hearing device having such an RF antenna. It is an even further object to provide a hearing device having such an RF antenna integrated in a housing of the hearing device.

In the present context, a "hearing device" refers to a device, such as e.g. a hearing aid, a listening device or an active ear-protection device, which is adapted to improve, augment and/or protect the hearing capability of a user by receiving acoustic signals from the users surroundings, generating corresponding audio signals, possibly modifying the audio signals and providing the possibly modified audio signals as audible signals to at least one of the users ears. A "hearing device" further refers to a device such as an earphone or a headset adapted to receive audio signals electronically, possibly modifying the audio signals and providing the possibly modified audio signals as audible signals to at least one of the users ears. Such audible signals may e.g. be provided in the form of acoustic signals radiated into the users outer ears, acoustic signals transferred as mechanical vibrations to the users inner ears through the bone structure of the users head and/or through parts of the middle ear as well as electric signals transferred directly or indirectly to the cochlear nerve and/or to the auditory cortex of the user.

A hearing device may be configured to be worn in any known way, e.g. as a unit arranged behind the ear with a tube leading air-borne acoustic signals into the ear canal or with a loudspeaker arranged close to or in the ear canal, as a unit entirely or partly arranged in the pinna and/or in the ear canal, as a unit attached to a fixture implanted into the skull bone, as an entirely or partly implanted unit, etc. A hearing device may comprise a single unit or several units communicating electronically with each other.

More generally, a hearing device comprises an input transducer for receiving an acoustic signal from a users surroundings and providing a corresponding input audio signal and/or a receiver for electronically receiving an input audio signal, a signal processing circuit for processing the input audio signal and an output means for providing an audible signal to the user in dependence on the processed audio signal. Some hearing devices may comprise multiple input transducers, e.g. for providing direction-dependent audio signal processing. In some hearing devices, the receiver may be a wireless receiver. In some hearing devices, the receiver may be e.g. an input amplifier for receiving a wired signal. In some hearing devices, an amplifier may constitute the signal processing circuit. In some hearing devices, the output means may comprise an output transducer, such as e.g. a loudspeaker for providing an air-borne acoustic signal or a vibrator for providing a structure-borne or liquid-borne acoustic signal. In some hearing devices, the output means may comprise one or more output electrodes for providing electric signals.

In some hearing devices, the vibrator may be adapted to provide a structure-borne acoustic signal transcutaneously or percutaneously to the skull bone. In some hearing devices, the vibrator may be implanted in the middle ear and/or in the inner ear. In some hearing devices, the vibrator may be adapted to provide a structure-borne acoustic signal to a middle-ear bone and/or to the cochlea. In some hearing devices, the vibrator may be adapted to provide a liquid-borne acoustic signal in the cochlear liquid, e.g. through the oval window. In some hearing devices, the output electrodes may be implanted in the cochlea or on the inside of the skull bone and may be adapted to provide the electric signals to the hair cells of the cochlea, to one or more hearing nerves and/or to the auditory cortex.

A "hearing system" refers to a system comprising one or two hearing devices, and a "binaural hearing system" refers to a system comprising one or two hearing devices and being adapted to cooperatively provide audible signals to both of the users ears. Hearing systems or binaural hearing systems may further comprise "auxiliary devices", which communicate with the hearing devices and affect and/or benefit from the function of the hearing devices. Auxiliary devices may be e.g. remote controls, remote microphones, audio gateway devices, mobile phones, personal computers, public-address systems, car audio systems or music players. Hearing devices, hearing systems or binaural hearing systems may e.g. be used for compensating for a hearing-impaired person's loss of hearing capability, augmenting or protecting a normal-hearing person's hearing capability and/or conveying electronic audio signals to a person.

As used herein, the singular forms "a", "an", and "the" are intended to include the plural forms as well (i.e. to have the meaning "at least one"), unless expressly stated otherwise. It will be further understood that the terms "has", "includes", "comprises", "having", "including" and/or "comprising", when used in this specification, specify the presence of stated features, integers, steps, operations, elements and/or components, but do not preclude the presence or addition of one or more other features, integers, steps, operations, elements, components and/or groups thereof. It will be understood that when an element is referred to as being "connected" or "coupled" to another element, it can be directly connected or coupled to the other element, or intervening elements may be present, unless expressly stated otherwise. As used herein, the term "and/or" includes any and all combinations of one or more of the associated listed items. The steps of any method disclosed herein do not have to be performed in the exact order disclosed, unless expressly stated otherwise.

BRIEF DESCRIPTION OF THE DRAWINGS

Further details are given below in connection with reference to the drawings in which.

The figures are schematic and simplified for clarity, and they just show details, which are essential to the understanding of the disclosure, while other details are left out. Throughout, like reference numerals and/or names are used for identical or corresponding parts.

Further scope of applicability of the present disclosure will become apparent from the detailed description given hereinafter. However, it should be understood that the detailed description and specific examples, while indicating embodiments of the disclosure, are given by way of illustration only, since various changes and modifications within the scope of the disclosure will become apparent to those skilled in the art.

MODE(S) FOR CARRYING OUT THE DISCLOSURE

Figure 1:
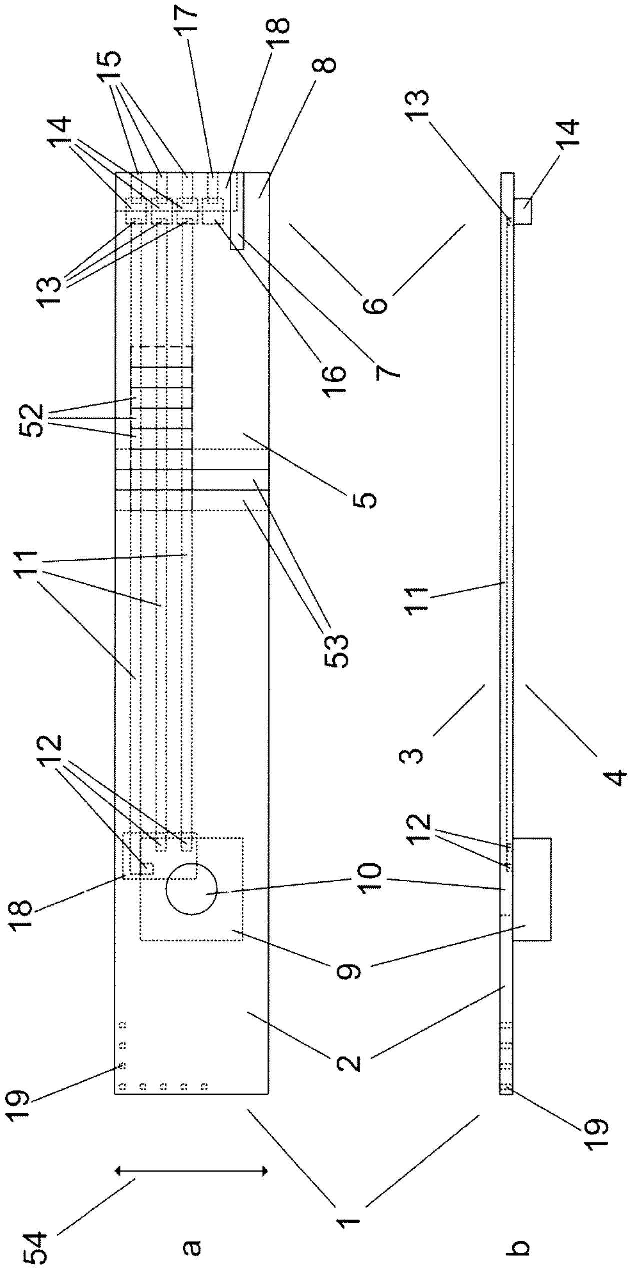
FIG. 1 shows an RF antenna.

FIG. 1 shows an RF antenna 1, respectively in a top view (a) and in a side view (b). The spatial orientation of the RF antenna 1 in the side view (b) is arbitrarily chosen to correspond with the orientation of the RF antenna 1 shown in FIG. 2, assuming that the hearing device 20 (shown in a side view in FIG. 2) is arranged in an operating position at a users ear and with the users head in an upright position. However, the orientation and directions may be chosen arbitrarily, depending on the intended use of the specific RF antenna 1 and/or of the specific hearing device 20. Directions, such as "top", "bottom", etc., mentioned in the following refer to the spatial orientation of the RF antenna 1 shown in the side view (b), unless otherwise stated.

The RF antenna 1 comprises a rectangular substrate 2 with a top side 3 and a bottom side 4. Each of the top side 3 and the bottom side 4 has a metallic layer, each occupying substantially the entire surface of the respective side 3, 4. The metallic layers are electrically connected to each other through several vias 19 distributed at least along the rim of the substrate 2 and together constitute an electrically conductive antenna element 5 having an elongate shape. At a feed end 6 of the antenna element 5, a cut-out 7 in the top-side metallic layer leaves a solderable pad 8, which may be used as a feed for electrically connecting the antenna element 5 to an RF transmitter and/or an RF receiver 44 (see FIGS. 2 and 3). A microphone 9 is mounted on the bottom-side 4 of the substrate 2, and a hole or channel 10 through the substrate 2 and the antenna element 5 fluidly connects an acoustic input port of the microphone 9 with the space above the RF antenna 1. The substrate 2 comprises a third metallic layer arranged between the top-side and bottom-side layers and not directly electrically connected thereto. The third metallic layer has a shape providing three electric leads 11 not directly electrically connected to each other. Each electric lead 11 provides a direct electric connection between a via with a solder pad 12 in the bottom-side metallic layer for a respective terminal of the microphone 9 and a via with a solder pad 13 in the bottom-side metallic layer for a first terminal of a respective decoupling inductor or coil 14. Three further solder pads 15 for respective second terminals of the decoupling inductors 14 are provided in the bottom-side metallic layer and thus allow electrically connecting the terminals of the microphone 9 through the respective leads 11 and inductors 14 to respective terminals of a preamplifier 40 (see FIG. 3). The leads 11 may thus be used to provide e.g. a power supply voltage or a bias voltage to the microphone 9 as well as to lead e.g. an audio output signal from the microphone 9 to the preamplifier 40. In a similar way, the antenna element 5 may function as a ground connection between the microphone 9 and the preamplifier 40. The microphone housing, which constitutes a ground terminal of the microphone 9, is directly electrically connected to the bottom-side metallic layer, and at the feed end 6 of the substrate 2 a first terminal of a further decoupling inductor 16 is directly electrically connected to the bottom-side metallic layer, while the second terminal of the decoupling inductor 16 is directly electrically connected to a further solder pad 17 provided in the bottom-side metallic layer and thus allowing electrically connecting the ground terminal of the microphone 9 through the antenna element 5 and the inductor 16 to a ground terminal of the preamplifier 40. The solder pads 12, 15, 17 are arranged within cut-outs 18 in the bottom-side metallic layer and are thus not directly electrically connected to the antenna element 5.

The RF antenna 1 is preferably used as a quarter-wavelength antenna, but may be operated at higher resonances as well. The RF antenna 1 may further comprise a tuning inductor (not shown) electrically connected in series between the antenna element 5 and the feed 8 or between the feed 8 and the RF transmitter or receiver 44. The tuning inductor may lower the frequency of resonance of the RF antenna 1 without increasing its physical dimensions and may thus allow receiving and/or transmitting RF signals with relatively low RF frequencies with an RF antenna 1 comprised in a relatively small device.

The RF antenna 1 is preferably used for receiving and/or transmitting electromagnetic RF signals within a relatively narrow RF frequency range that encloses one of the frequencies of resonance of the RF antenna 1. In the following, the term "wavelength" refers to the free-air wavelength at the utilised resonance, unless otherwise stated. The frequencies of resonance of an antenna are generally determined by various factors, such as antenna dimensions, materials in and thickness of the electrically conductive elements, presence of electrically conductive elements close to the antenna, the electric load provided by a connected RF transmitter or receiver, etc. The inductors 14, 16 are adapted and/or dimensioned such that they reflect and attenuate signals within the RF frequency range utilised by the RF antenna 1 and pass signals within the much lower audio frequency range utilised by the microphone 9. The RF frequency range and the audio frequency range thus form two different frequency ranges. The two frequency ranges preferably do not overlap. The inductors 14, 16 preferably have a self-resonance frequency within the RF frequency range in order to achieve a strong reflection and attenuation in the RF frequency range and thus a good decoupling of the RF signals, while at the same time allowing the audio frequency range signals to pass substantially without attenuation. Instead of the decoupling inductor 16, a small inductor may be used which might improve the immunity performance of the microphone system when no other coupling device is present. This small inductor may be in a range above 0.1 nH and below 10 nH, such as below 4 nH, such as below 3 nH, such as below 2 nH, such as below 1 nH, such as in the range 0.1 to 5 nH. The small inductor will make the antenna structure function as an IFA antenna instead of the monopole-type function disclosed elsewhere. The decoupling ensures on the one hand that RF signals do not enter the preamplifier 40 and thus do not disturb the audio signal reception, and on the other hand that the microphone 9 and the leads 11 are "seen" by the antenna element 5 as a floating element that does not short the RF signals to ground. Furthermore, the microphone 9 and the leads 11 are arranged with relatively large surfaces facing correspondingly relatively large surfaces of the antenna element 5 at a relatively short distance, and the microphone 9 and the leads 11 therefore couple mainly capacitively to the antenna element 5, such that the electric fields in the electrically conductive parts of the microphone 9 and in the leads 11 follow the electric field in the antenna element 5 quite closely. Thus, the components 9 and the leads 11 present only a relatively weak load to the antenna element 5, and the effect of the microphone 9 and the leads 11 on the RF properties of the RF antenna 1 is substantially reduced. The effect may be further reduced by increasing the capacitive coupling between the antenna element 5 and the audio-frequency components 9, 11, e.g. by connecting one or more capacitors (not shown) between each lead 11 and/or the microphone 9 on one side and the antenna element 5 on the other side. Such capacitors may e.g. have a capacitance above 1 pF or above 5 pF, preferably in the range of about 10 pF to 20 pF. The leads 11 and the microphone 9, and optionally the capacitors, should be dimensioned and arranged such that the capacitive coupling between the antenna element 5 and the audio-frequency components 9, 11 is substantially larger than the inductive coupling between those components 5, 9, 11. The RF antenna 1 thus allows arranging the antenna element 5 and audio-frequency components 9, 11 very close to each other, and thus allows saving space in e.g. a hearing device

20. Another advantage of the RF antenna 1 is that the total number of parts may be reduced, and thus costs may be saved, compared to when the RF antenna 1 and the microphone 9 with its leads 11 are manufactured as separate parts.

Since preamplifiers 40 normally have relatively large input impedances, typically in the range of several kOhm, the inductors 14, 16 may have impedances in the audio frequency range corresponding to several Ohm, e.g. 1-10 Ohm or even 10-100 Ohm, without substantially attenuating the microphone output signals. Conversely, the impedance of a quarter-wave antenna may be as low as 50 Ohm or even lower, and thus, an impedance corresponding to 10 kOhm-100 kOhm, or even as low as 1 kOhm-10 kOhm or 100 Ohm-1 kOhm may suffice to decouple the preamplifiers 40 from the antenna element 5 in the RF frequency range.

The microphone 9 and the leads 11 are preferably arranged within a maximum distance to the antenna element 5 of less than 2% of the wavelength to ensure a large capacitive coupling to the antenna element 5. For at least one of the microphone 9 and the leads 11, the maximum distance may preferably be reduced to less than 1% or even less than 0.5% of the wavelength. The microphone 9 may inherently have a size that makes it impossible to arrange the entire component within the relevant maximum distance; in this case, at least a portion of the microphone 9 is preferably arranged within the relevant maximum distance from the antenna element 5.

The substrate 2, and thus the antenna element 5, need not be rectangular or elongate, but should in general be dimensioned to provide one or more salient RF resonances. The substrate 2, and thus the antenna element 5, may be planar, or piecewise planar with one or more bends, and/or have arbitrarily shaped, possibly curved surfaces 3, 4, e.g. in order to allow the RF antenna 1 to fit to a desired shape of a housing 21 (see FIG. 2) in which it is to be arranged. In some embodiments, the antenna element 5 may e.g. have a generally square shape or a disc-like shape.

The leads 11 together may be thought of as forming a composite lead structure consisting of a number of consecutive segments 52 separated by planes extending perpendicularly to the direction of current flow in the leads 11. In order to further reduce the effect of the leads 11 on the RF properties of the RF antenna 1, the width of each such segment 52 is preferably smaller than the local width of the antenna element 5, the local width being the width of the particular section 53 of the antenna element 5 that is closest to the respective segment 52. This preferably applies at least to such segments 52 that are within the relevant maximum distance from the antenna element 5. In the present context, the width of an object should be interpreted as the extension of the object in a direction perpendicular to the current flow in the segment 52 and perpendicular to the shortest connecting geometric line between the segment 52 and the antenna element 5. In the RF antenna 1 shown in FIG. 1 this direction is the same for substantially all segments 52 and is illustrated in the top view (a) by the arrow 54. The local width requirement is preferably applied to all segments 52 of the composite lead structure. It may preferably also be applied to the microphone 9, such that the antenna element 5 has a local width that exceeds the width of the microphone 9 in section(s) 53 lying close to the microphone 9, e.g. within the relevant maximum distance therefrom.

In order to further reduce the effect of the leads 11 on the RF properties of the RF antenna 1, a surface of the antenna element 5 preferably completely surrounds the closest projection of the leads 11 onto this surface, possibly except at the inductors 14. In the present context, the term "closest projection" means that each portion of a lead 11 is projected along the shortest possible geometric line to the surface of the antenna element 5. The surface of the antenna element 5 preferably also completely surrounds a corresponding projection of the microphone 9. The top view (a) in FIG. 1 can be seen as illustrating a vertical projection of the leads 11 and the microphone 9 onto the surface of the antenna element 5, which for a planar configuration is also the closest projection, and it can thus easily be seen that the antenna element 5 completely surrounds the projection of all of the leads 11 and also completely surrounds the projection of the microphone 9, i.e. the antenna element 5 has "land" extending past all outer edges of the projections. In order to further reduce the effect of the leads 11 and the microphone 9 on the RF properties of the RF antenna 1, the total surface area of the antenna element 5 is preferably at least 3 times, at least 5 times or at least 10 times the total surface area of the leads 11 and the microphone 9.

As an example similar to the one shown in FIG. 1, a planar RF antenna 1 may comprise three planar leads 11, each 0.5 mm wide and arranged in a common plane with a distance of 0.5 mm to the respective neighbouring lead(s) 11. The composite lead structure may thus have a width of 5×0.5 mm=2.5 mm. The leads 11 may extend 20 mm from the feed end 6 of the antenna element 5, which may be 30 mm long and resonate at a frequency with a wavelength of 120 mm. The maximum distance for the leads 11 may be chosen as 1% of the wavelength, i.e. 1.2 mm. Each section 53 of the antenna element 5 that has a lead 11 within 1.2 mm (which in this example is true for the particular section 53 of the antenna element 5 that extends from the feed end 6 to about 20 mm therefrom) preferably has a width that is larger than 2.5 mm and could thus e.g. be about 5 mm wide. The remaining antenna sections 53 may optionally have a smaller local width. For instance, in the case that only two adjacent leads 11 of the three leads 11 extend further to 25 mm from the feed end 6, the section 53 of the antenna element 5 that extends from about 20 mm to about 25 mm from the feed end 6, preferably has a local width that is larger than 3×0.5 mm, i.e. larger than 1.5 mm.

Preferably, the local width of the antenna element 5 exceeds the local width of the composite lead structure by at least 20%, at least 50% or at least 100%, preferably at least for sections 53 lying within the relevant maximum distance from the leads 11 and/or the microphone 9. Preferably, the local width of the antenna element 5 exceeds the maximum width of the composite lead structure for all of these sections 53. This local width may preferably exceed the maximum width of the composite lead structure by at least 20%, at least 50% or at least 100%.

In the shown embodiment, the two metallic layers of the antenna element 5 and the vias 19 substantially enclose the leads 11 in a pocket or cage within the antenna element 5, which efficiently prevents the leads 11 from affecting the total radiation efficiency of the RF antenna 1. In some embodiments, the vias 19 may distributed otherwise, e.g. in a lattice-like pattern, or the vias 19 may be replaced by an electrically conductive layer connecting the top-side and the bottom-side metallic layers along the entire rim of the substrate 2, possibly except near the solder pads 15, 17. In some embodiments, the top-side or the bottom-side metallic layer and the vias 19 may be omitted with the drawback of an increased effect on the total radiation efficiency.

In some embodiments, the microphone 9 may be replaced with other types of electronic components, such as e.g. a loudspeaker 24 (see FIGS. 2 and 3) or another kind of transducer for providing an acoustic signal, a user-operable control or an inductor for communicating using near-field magnetic induction signals. Also, more than one electronic component 9 may be arranged in a similar way, i.e. with itself and its leads 11 close to the antenna element 5 and decoupled by means of inductors 14, 16 at the feed end 6 of the antenna element 5. Generally, the leads 11 may be used to lead one or more electric or electronic signals between one or more electronic components 9 and one or more electronic circuits electrically connected to the RF antenna 1 via the inductors 14, 16, such as e.g. a preamplifier 40, a power amplifier 43 (see FIG. 3), a user-interface controller and/or a transceiver for communication using near-field magnetic induction signals. Generally, the inductors 14, 16 should be dimensioned to pass signals within the particular frequency range(s) utilised by the specific electronic component(s) 9. Where suitable, any considerations made above regarding the microphones 9 apply mutatis mutandi to such other electronic components 9.

In order to allow for proper decoupling, the RF frequency range and the frequency range utilised by the one or more electronic components 9 should not overlap. Preferably, the frequency range utilised by the electronic components 9 is significantly lower than the RF frequency range. The RF frequency range is preferably within the frequency range 800 MHz-10 GHz, within 2 GHz-6 GHz, or even more preferably with 2.2 GHz-2.6 GHz. In these frequency ranges, the effect of having a mainly capacitive coupling between the antenna element 5 and floating leads 11 and/or electronic components 9 and the benefit of physically combining the antenna element 5 and the electronic components 9 are both substantial. The frequency range utilised by the electronic components 9 is preferably below 1 GHz, below 100 MHz, below 10 MHz, below 1 MHz, below 100 kHz, or even more preferably below 20 kHz, in order to allow a substantial decoupling by the inductors 14, 16 in the RF frequency range.

The microphone 9 may e.g. be an MEMS microphone. The substrate 2 and the metallic layers may e.g. be constituted by a rigid, a semi-flexible or a flexible printed circuit board (PCB). In some embodiments, the metallic layers may be replaced with layers of other electrically conductive materials. In some embodiments, the substrate 2 may be metallic or otherwise electrically conductive and thus constitute the antenna element 5. In such embodiments, the top-side and bottom-side layers may be omitted, and the electric leads 11 and the solder pads 12, 13, 15 may be attached to the substrate 2 with a layer of electrically insulating material therebetween.

The decoupling inductors 14, 16 and/or the solder pads 15, 17 for connecting electronic components 9 to electronic circuits 40 are preferably arranged near the feed 8 in order to allow the antenna element 5 to stand off from an electronics assembly connected to the antenna element 5. In some embodiments, the decoupling inductors 14, 16 and/or the solder pads 15, 17 may be arranged away from the feed 8, such as e.g. at an opposite end or side of the antenna element 5 or at an intermediate location.

Figure 2:
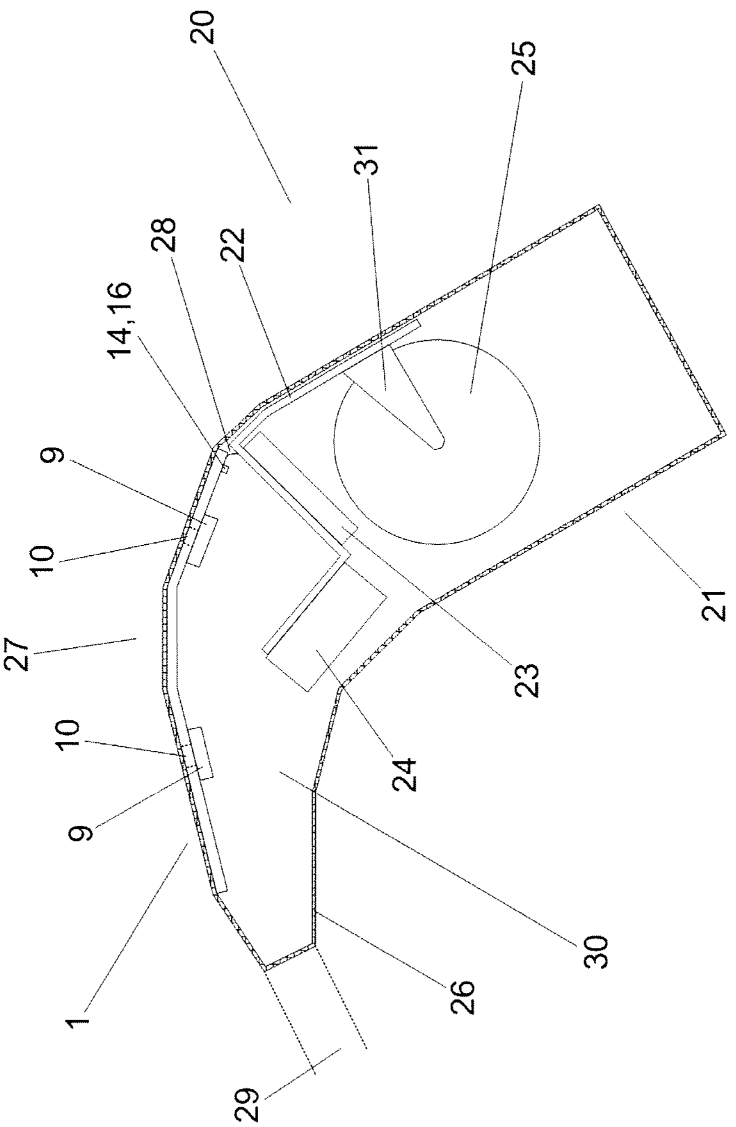
FIG. 2 shows a hearing device.

FIG. 2 shows a side view of a hearing device 20 with a section through its housing 21. The hearing device 20 comprises an RF antenna 1 and a main PCB 22 with a signal processing circuit 23, a loudspeaker 24 and a battery 25 mounted thereon. The RF antenna 1 is similar to the one shown in FIG. 1, however with two microphones 9 and a correspondingly larger number of leads 11, solder pads 12, 13, 15 and inductors 14. Two through holes or channels 10 in the RF antenna 1 extend further through the housing wall 26 in order to allow acoustic signals from the exterior of the housing 21 to reach the acoustic input ports of the microphones 9. The substrate 2 of the RF antenna 1 has a shape that allows it to fit into the inside of the housing wall 26 in the top portion 27 of the housing 21. A number of wires 28 electrically connect the respective solder pads 15, 17 and the feed 8 with corresponding solder pads on the main PCB 22.

The main PCB 22 has a ground plane 48 (see FIG. 3) to which ground terminals of the signal processing circuit 23 and the loudspeaker 24 as well as one terminal 47 (see FIG. 3) of the battery 25 are electrically connected, the latter through a metallic spring 31. The antenna element 5 is electrically connected to the ground plane 48 through the inductor 16, the solder pad 17, a first one of the wires 28 and a solder pad on the main PCB 22. The signal processing circuit 23 comprises an RF transceiver 44 (see FIG. 3) and two preamplifiers 40. An RF input/output terminal of the RF transceiver 44 is electrically connected through a second one of the wires 28 to the feed 8, and the preamplifiers 40 are electrically connected through further of the wires 28 to the solder pads 15, 17 and thus to the microphones 9 through the inductors 14, 16.

The main PCB 22 further has a number of lead patterns constituting various other electric connections between the components 23, 24, 25 mounted thereon. The battery 25 supplies power to the signal processing circuit 23, and the loudspeaker 24 is connected fluidly through a channel (not shown) to a tube 29 that leads the acoustic output signal from the loudspeaker 24 to the ear canal of the user.

The relatively large electrically conductive surfaces provided by the ground plane 48 of the main PCB 22 and the therewith electrically connected battery terminal 47, which are arranged primarily at the feed end 6 of the antenna element 5, allow the RF antenna 1 to operate substantially as a monopole antenna. The RF antenna 1 extends partly through a portion 30 of the housing 21 which may be adapted to be arranged on the top of the ridge between the pinna and the head of the user when the hearing device 20 is in its operating position, and the RF antenna 1 is therefore located where the conditions for receiving and transmitting electromagnetic RF signals in the GHz range from/to the environment are relatively good. At the same time, the microphones 9 are located at the top portion 27 of the housing 21 where the conditions for receiving acoustic signals from the environment are also good.

In some embodiments, the main PCB 22 may be extended such that a part hereof constitutes the substrate 2 and the metallic layers of the RF antenna 1, in which case the solder pads 15, 17 and the wires 28 may be omitted. In this case, the feed 8 is preferably arranged such that the RF input/output terminal of the RF transceiver 44 may be soldered, or otherwise connected, directly to the feed 8. In some embodiments, the loudspeaker 24 may be arranged in an ear plug external to the housing 21, and an audio output signal of the signal processing circuit 23 may be led to the loudspeaker 24 through electric leads through the tube 29 or in a cable replacing the tube 29.

Figure 3:
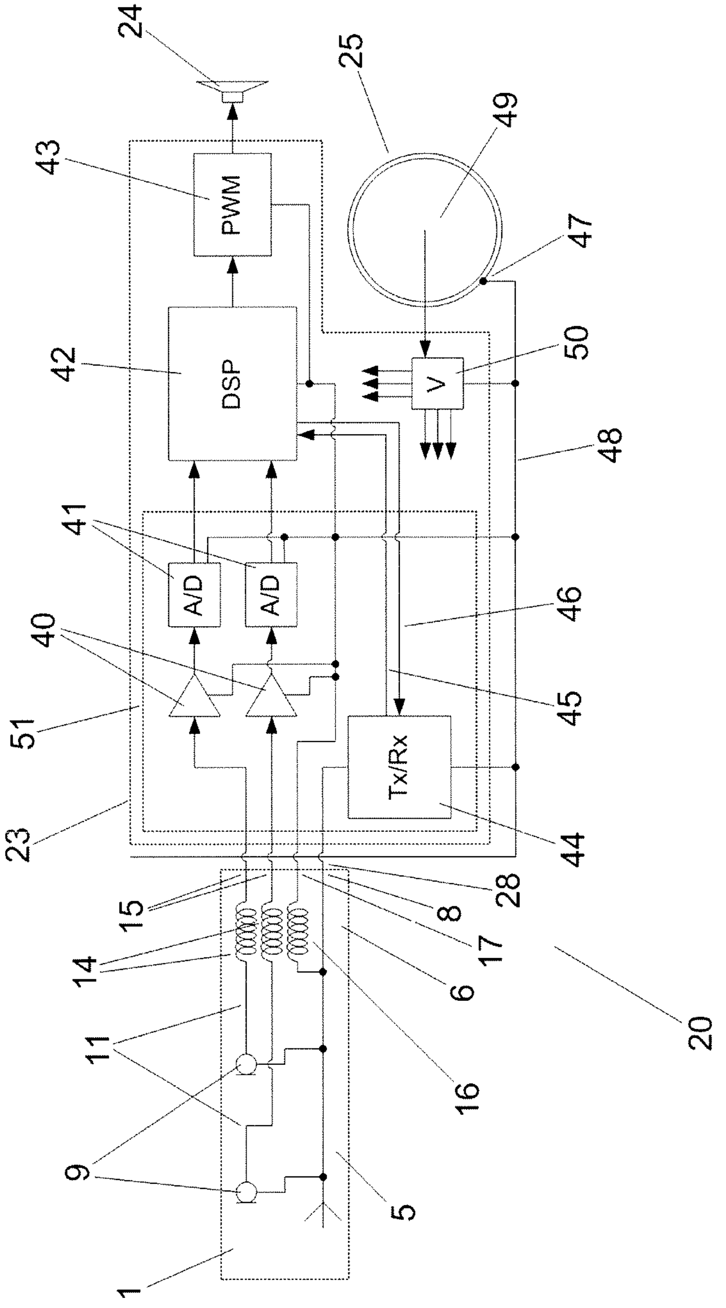
FIG. 3 shows a block diagram of the hearing device of FIG. 2.

FIG. 3 shows a block diagram of the hearing device 20 of FIG. 2. The outputs of the two microphones 9 are electrically connected through the respective leads 11, inductors 14, solder pads 15 and wires 28 to inputs of the respective preamplifiers 40. Similar applies to power supply, bias voltage and other electric connections (not shown) required to operate the microphones 9. Ground terminals of the preamplifiers 40 are electrically connected through the ground plane 48, a wire 28, the solder pad 17, the inductor 16 and the antenna element 5 to the housings of the microphones 9. An output of each of the preamplifiers 40 is electrically connected to an input of a respective digitiser 41, and an output of each of the digitisers 41 is electrically connected to a respective input of a digital signal processor 42. An output of the digital signal processor 42 is electrically connected to an input of a pulse-width modulator 43, and an output of the pulse-width modulator 43 is electrically connected to an input of the loudspeaker 24. The RF input/output terminal of the RF transceiver 44 is electrically connected to the antenna element 5 through a wire 28 and the feed 8 at the feed end 6 of the RF antenna 1. The RF transceiver 44 is further electrically connected through respectively a receive line 45 and a transmit line 46 to respectively an input and an output of the digital signal processor 42. A negative terminal 47 of the battery 25 is connected to the ground plane 48 and a positive terminal 49 of the battery 25 is connected to power inputs of the electronic circuits 40, 41, 42, 43, 44 through a voltage regulator 50. The preamplifiers 40, the digitisers 41 and the RF transceiver 44 together constitute an input circuit 51, whereas the preamplifiers 40, the digitisers 41, the digital signal processor 42, the pulse-width modulator 43, the RF transceiver 44 and the voltage regulator 50 together constitute the signal processing circuit 23.

The preamplifiers 40 amplify the respective microphone output signals, and the digitisers 41 digitise the respective amplified microphone signals and provide corresponding audio input signals to the digital signal processor 42. The RF transceiver 44 provides further audio input signals through the receive line 45 to the digital signal processor 42 in dependence on RF signals received through the RF antenna 1. The digital signal processor 42 processes or modifies one or more of the input audio signals in accordance with the purpose of the hearing device 20, e.g. to improve, augment or protect the hearing capability of the user and/or to convey electronic audio signals to the user, and provides a corresponding processed output signal to the pulse-width modulator 43, which pulse-width modulates the processed output signal and provides a pulse-width modulated signal to the loudspeaker 24. The pulse-width modulator 43 can source a relatively large current output and thus also functions as a power amplifier for the processed output signal. The loudspeaker 24 provides an acoustic output signal to the users ear in dependence on the pulse-width modulated signal. The digital signal processor 42 may provide audio signals through the transmit line 46 to the RF transceiver 44, which may transmit corresponding RF signals through the RF antenna 1.

The RF transceiver 44 may further provide control signals and/or other data to the digital signal processor 42 in dependence on RF signals received through the RF antenna 1. The digital signal processor 42 may adjust its processing of the one or more audio input signals in response to information comprised in one or more audio input signals, control signals and/or other data received from the RF transceiver 44. This allows the hearing device 20 to change its audio signal processing in response to e.g. commands, status information and/or audio signals received wirelessly in an electromagnetic RF signal from a remote device (not shown). The remote device may e.g. be a remote control, a second hearing device 20 arranged at or in the respective other ear of the user or an auxiliary device. The digital signal processor 42 may provide audio signals, control signals and/or other data to the RF transceiver 44, which may transmit corresponding RF signals through the RF antenna 1, e.g. to a second hearing device 20. The hearing device 20 may thus be part of a binaural hearing system.

In some embodiments, any of the digitisers 41, the digital signal processor 42 and the pulse-width modulator 43 may be omitted and replaced with one or more corresponding analog components or functional blocks, such as e.g. analog filters, analog amplifiers and/or analog or digital power amplifiers for analog signals. In some embodiments, the RF transceiver 44 may be replaced by an RF receiver or an RF transmitter or by both. The RF transceiver, RF receiver or RF transmitter 44 may comprise any circuits normally comprised in such components for receiving and/or transmitting RF signals in the GHz range. In some embodiments, the microphones 9, the preamplifiers 40 and the digitisers 41 may be omitted, and only the RF transceiver 44 or an RF receiver may provide one or more audio input signals to the digital signal processor 42 or another circuit for processing. In some embodiments, the loudspeaker 24 may be replaced with one or more other output means, such as e.g. a vibrator or a plurality of output electrodes.

The signal processing circuit 23 is preferably implemented mainly as digital circuits operating in the discrete time domain, but any or all suitable parts hereof may alternatively be implemented as analog circuits operating in the continuous time domain. Digital functional blocks of the signal processing circuit 23, e.g. the digital signal processor 42 and/or portions of the RF transceiver 44, may be implemented in any suitable combination of hardware, firmware and software and/or in any suitable combination of hardware units. Furthermore, any single hardware unit may execute the operations of several functional blocks in parallel or in interleaved sequence and/or in any suitable combination thereof.

The RF antenna 1 may be used in any type of device, however most advantageously in battery-driven and/or portable devices, which typically provide relatively little space for internal components.

In such small devices, including hearing devices 20, and even such with another type of RF antenna 1 than the one disclosed herein, monitoring means (not shown) may advantageously monitor the current and/or the voltage of an electric signal applied to and/or received by the RF antenna 1, or otherwise determine variations in the electromagnetic load on the RF antenna 1, and use such determined variations to estimate when the user places a finger on the outside of the device housing 21. The monitoring means may be used alone or together with other sensory means to allow touch control of device functions. Since the RF antenna 1 is quite sensitive to close-by objects, variations in the antenna load can indicate e.g. a finger touching the housing 21 close to the RF antenna 1, and this may be used instead of other user controls to allow the user to control e.g. a gain of the hearing device 20 or other settings.

In a binaural hearing system with two hearing devices 20, the electric components 9 in any or both of the devices 20 may comprise a one- or two-dimensional array of inductors or coils (not shown) for communicating using near-field magnetic induction signals. The transmitters and/or receivers (not shown) connected to these inductors may be adapted to perform beamforming by applying different amplitude changes and/or phase shifts to respectively a common transmit signal or the multiple received signals in order to increase the inductive coupling between the transmitting array and the receiving array. The two hearing devices 20 may comprise respectively a transmitter and a receiver, or they may each comprise both a transmitter and a receiver in order to allow bidirectional communication. The arrays may preferably be oriented such within the two hearing devices 20 that the inductive coupling between the arrays is at a maximum when each of the hearing devices 20 is in its respective operating position at the respective ear. The use of an inductor array in at least one of the hearing devices 20 is particularly advantageous in a binaural hearing system, because the relative positions and orientations of the hearing devices 20 is normally stable and well known when they are worn at the ears. Inductor arrays may also be used in hearing devices 20 without an RF antenna 1 or with another type of RF antenna 1 than the one disclosed herein.

Further modifications obvious to the skilled person may be made to the disclosed devices. Within this description, any such modifications are mentioned in a non-limiting way.

Some embodiments have been described in the foregoing, but it should be stressed that the claims are not limited to these, but may be embodied in other ways within the subject-matter defined in the following claims. For example, the features of the described embodiments may be combined arbitrarily, e.g. in order to adapt the system, the devices according to the invention to specific requirements.

Any reference numerals and names in the claims are intended to be non-limiting for their scope.

The invention claimed is:

1. A hearing aid comprising:

a housing;

an input transducer for receiving an acoustic signal from a users surroundings and providing a corresponding input audio signal and/or a receiver for electronically receiving an input audio signal;

a signal processing circuit for processing the input audio signal;

an RF antenna arranged in the housing, the RF antenna configured to receive and/or transmit electromagnetic RF signals within a first frequency range enclosing a first frequency of resonance of the RF antenna corresponding to a first wavelength;

a loudspeaker configured to be positioned in the ear canal of the user and to provide an audible signal to the user in dependence on the processed audio signal; and one or more electric leads electrically connected to lead one or more electric signals within a second frequency range not overlapping the first frequency range between the loudspeaker in the ear canal of the user and an electronic circuit in the housing, wherein the one or more electrical leads together forms a composite lead structure consisting of a number of consecutive segments separated by planes extending perpendicularly to the direction of current flow in the leads.

2. The hearing aid according to claim 1, wherein the RF antenna comprises:

an electrically conductive antenna element having a feed for electrically connecting to an RF transmitter and/or an RF receiver; and an electronic component, arranged in proximity of the electrically conductive antenna element, wherein the one or more electric leads are electrically connected to lead the one or more electric signals between the electronic component and the electronic circuit, each of the one or more electric leads being electrically connected to the electronic circuit through a respective decoupling component.

3. The hearing aid according to claim 2, wherein the electronic component is configured to perform at least one of:

receiving one or more electric signals from an electronic circuit within a second frequency range not overlapping the first frequency range, and providing the one or more electrical signals to the electronic circuit within the second frequency range not overlapping the first frequency range; and the decoupling component is configured to reflect and/or attenuate signals within the first frequency range and pass signals within the second frequency range.

4. The hearing aid according to claim 2, wherein the decoupling component is an inductor having an inductance in the range of above 0.1 nH and below 10 nH.

5. The hearing aid according to claim 4, wherein the one or more electric leads and the inductor are positioned on the same substrate.

6. The hearing aid according to claim 5, wherein the substrate is a printed circuit board having a ground plane; and the hearing aid further comprises a battery and the printed circuit board comprises a battery terminal, which is arranged primarily at a feed end of the antenna element.

7. The hearing aid according to claim 4, wherein a surface of the antenna element completely surrounds the closest projection of all of the one or more electric leads and/or of the inductor for communicating onto said surface of the antenna element.

8. The hearing aid according to claim 4, wherein the antenna element comprises two or more electrically conductive layers electrically connected to each other, and wherein the one or more leads are arranged between the two or more electrically conductive layers.

9. The hearing aid according to claim 2, wherein the decoupling component is an inductor having a self-resonance frequency within the first frequency range.

10. The hearing aid according to claim 2, wherein the electronic component is a microphone.

11. A hearing aid comprising:

a housing;

an input transducer for receiving an acoustic signal from a user's surroundings and providing a corresponding input audio signal and/or a receiver for electronically receiving an input audio signal;

a signal processing circuit for processing the input audio signal;

an RF antenna arranged internally in the housing, the RF antenna configured to receive and/or transmit electromagnetic RF signals within a first frequency range enclosing a first frequency of resonance of the RF antenna corresponding to a first wavelength;

a loudspeaker configured to be positioned in the ear canal of the user and to provide an audible signal to the user in dependence on the processed audio signal, wherein an electric connection is configured to lead an audio signal from the signal processor in the housing to the loudspeaker and the electric connection is decoupled at the first frequency range at a connector end of one or more electric leads; and the one or more electric leads electrically connected to lead one or more electric signals within a second frequency range not overlapping the first frequency range between the loudspeaker in the ear canal of the user and an electronic circuit in the housing.

12. The hearing aid according to claim 11, further comprising a feed for electrically connecting the RF antenna to an RF transmitter and/or an RF receiver; and an electronic component, arranged in proximity of the electrically conductive antenna element, wherein the one or more electric leads are electrically connected to lead the one or more electric signals between the electronic component and the electronic circuit, each of the one or more electric leads being electrically connected to the electronic circuit through a respective decoupling component.

13. The hearing aid according to claim 11, where in the first frequency range is within 2 GHz-6 GHz.

14. The hearing aid according to claim 11, wherein the hearing aid housing is a single unit whereto the loudspeaker is mechanically connected via the electric connection.

* * * * *